US008903311B1

(12) United States Patent
Maryanka et al.

(10) Patent No.: US 8,903,311 B1
(45) Date of Patent: Dec. 2, 2014

(54) METHOD OF SIGNAL TRANSMISSION USING FIBER COMPOSITE SANDWICH PANEL

(75) Inventors: Yair Maryanka, Tel-Aviv (IL); Moshe Israel Meidar, New York, NY (US); Richard A. Curless, Cincinnati, OH (US)

(73) Assignees: 5ME IP, LLC, Cincinnatti, OH (US); Yamar Electronics Ltd, Tel-Aviv (IL)

( * ) Notice: Subject to any disclaimer, the term of this patent is extended or adjusted under 35 U.S.C. 154(b) by 203 days.

(21) Appl. No.: 13/587,435

(22) Filed: Aug. 16, 2012

Related U.S. Application Data

(60) Provisional application No. 61/524,025, filed on Aug. 16, 2011.

(51) Int. Cl.
*H04B 7/24* (2006.01)

(52) U.S. Cl.
CPC .......... *H04B 7/24* (2013.01)
USPC .......... 455/41.1; 455/345

(58) Field of Classification Search
CPC .......... H04B 1/00; H04B 1/20; H04B 7/00; H04B 7/24; H04B 13/00; H04B 13/02; H04B 17/00
See application file for complete search history.

(56) References Cited

U.S. PATENT DOCUMENTS

| | | | | |
|---|---|---|---|---|
| 4,281,803 | A | | 8/1981 | Massey |
| 4,724,873 | A | | 2/1988 | Abe |
| 5,022,952 | A | | 6/1991 | Vaniglia |
| 5,110,395 | A | | 5/1992 | Vaniglia |
| 5,223,072 | A | | 6/1993 | Brockman et al. |
| 5,264,064 | A | * | 11/1993 | Hughes .......... 156/281 |
| 5,454,897 | A | | 10/1995 | Vaniglia |
| 5,645,677 | A | | 7/1997 | Cahuzac et al. |
| 5,662,759 | A | | 9/1997 | Cornet et al. |
| 5,679,195 | A | | 10/1997 | O'Dwyer et al. |
| 5,727,025 | A | | 3/1998 | Maryanka |
| 6,096,164 | A | | 8/2000 | Benson et al. |
| 6,112,792 | A | | 9/2000 | Barr et al. |
| 6,491,773 | B1 | | 12/2002 | Miller et al. |
| 6,691,007 | B2 | | 2/2004 | Haugse et al. |
| 6,703,766 | B2 | | 3/2004 | Duerr |
| 7,010,050 | B2 | | 3/2006 | Maryanka |
| 7,017,421 | B2 | | 3/2006 | Kehlenbach |
| 7,353,853 | B2 | | 4/2008 | Borgmann et al. |
| 7,524,398 | B2 | | 4/2009 | Downing et al. |
| 7,830,523 | B2 | | 11/2010 | Bommer et al. |
| 2006/0255945 | A1 | * | 11/2006 | Egbert .......... 340/572.7 |
| 2009/0184877 | A1 | | 7/2009 | Bommer |
| 2009/0205429 | A1 | | 8/2009 | Bommer et al. |
| 2009/0229760 | A1 | | 9/2009 | Hamlyn et al. |
| 2010/0127802 | A1 | | 5/2010 | Olson et al. |
| 2010/0186879 | A1 | | 7/2010 | Machamer |
| 2010/0318243 | A1 | | 12/2010 | Lewis et al. |
| 2014/0094120 | A1 | * | 4/2014 | Puterbaugh et al. .......... 455/41.1 |

* cited by examiner

*Primary Examiner* — Thanh Le
(74) *Attorney, Agent, or Firm* — Reising Ethington P.C.

(57) ABSTRACT

A method of wireless communication uses a fiber composite structure including a first conductive fiber composite layer comprising carbon fiber, a second conductive fiber composite layer comprising carbon fiber, and an insulating layer electrically isolating the first composite layer from the second composite layer. Communication devices such as transceivers are connected to the first and second composite layers and signals may be communicated to and from the communication devices through the composite layers. An AC or DC voltage may be applied to the first and second composite layers to conduct electrical power to the electrical devices without the requirement of separate wires.

21 Claims, 2 Drawing Sheets

METHOD OF SIGNAL TRANSMISSION USING FIBER COMPOSITE SANDWICH PANEL

FIELD

The device relates to a method of transmitting information signals or power over a fiber composite sandwich panel without the use of separate wires or other transmission mediums.

BACKGROUND

Composite materials are increasingly used as a building material in aviation, automotive and renewable energy structures such as solar panels and wind blades. This specification describes a method of using a fiber composite sandwich panel to transmit signals such as data, voice, music, video, or a command between a plurality of devices that are connected to the fiber composite panel without a need for additional wiring. The fiber composite sandwich panel comprises at least two layers of electrically conductive composite material such as carbon fiber that are separated by an electrically insulating composite material such as fiberglass. A transceiver device and data devices such as sensors and actuators are connected to carbon fiber layers that conduct signals to and from the data devices. The carbon fiber layers can also be used to provide power to the data devices.

Possible communication methods are described in the United States patent to Maryanka, U.S. Pat. No. 5,727,025 for Voice, Music, Video and Data Transmission Over Direct Current Wires which teaches the high speed transmission of data over DC power lines with error control by means of channel coding and modulation. In the '025 patent, the carrier is conveyed by at least one medium selected from the group consisting of a utility power line, a DC power line, a dedicated communication wire, a fiber optic cable, a radio wave, an ultrasonic wave, and a magnetic field. Further, the United States patent to Maryanka, U.S. Pat. No. 7,010,050 for Signaling Over Noisy Channels teaches a system and method for signaling among a plurality of devices via a communication carrier over a noisy medium such as a power line, and particularly relates to an innovative method and system for high speed signaling using an innovative modulation scheme. In the '050 patent, a transmitter transmits an arbitrary datum over a channel of a communication carrier selected from the group consisting of a utility power line, a DC power line, a dedicated communication wire, a fiber optic cable, a radio wave, an ultrasonic wave, and a magnetic field. The teachings of both Maryanka patents are incorporated herein by reference.

Both of the Maryanka prior art patents rely on the use of certain named mediums for the transmission of signals. In the present device, the signals are conducted over a high strength fiber composite laminate that forms the structure of a shell or a mobile enclosure. The shell may be the frame of a seat, and the mobile enclosure may be a vehicular or aeronautical device. No separate wire or conductive medium other than the fiber composite laminate is required in order to convey the signals.

The published application of Olson et al, US 2010/0127802, discloses a sandwich vehicle structure having integrated electromagnetic radiation pathways in which a core extends between upper and lower conducting plates. The core comprises a core medium and a plurality of spaced apart core members embedded in the core medium having different electromagnetic properties allowing for propagation of electromagnetic radiation within the core. The radiation may be received by one or more transceivers, transducers, or sensors that are positioned on the structure. In the Olson device however, the electromagnetic energy is radiated within the core, electromagnetic energy is not conducted by the upper and lower conducting plates.

DESCRIPTION OF THE PREFERRED EMBODIMENT

Figure 1:
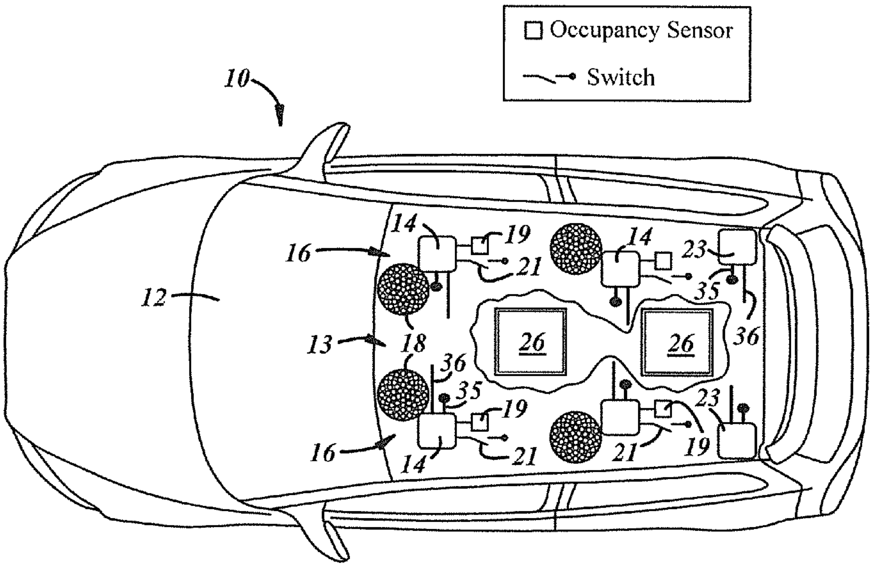
FIG. 1 is an overhead view of a vehicle roof layout with various equipment clusters mounted on the interior thereof.
Figure 2:
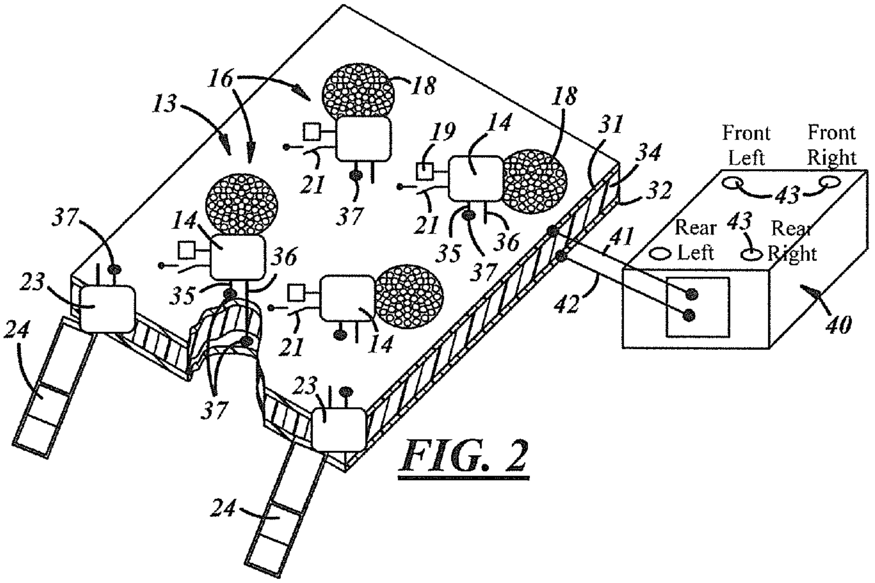
FIG. 2 is a partial view of the vehicle roof layout of FIG. 1 with a controller device attached.

Turning now to FIG. 1, a vehicle having a powerline communication system is generally designated by the reference numeral 10. The term "powerline" is used to designate a conductive medium that is used to transfer AC or DC power. The vehicle has a front windscreen 12 that is in front of a passenger compartment that is enclosed by a roof 13 of fiber composite material. Individual clusters 16 of electrical devices are mounted in the interior of the vehicle on the roof 13. The devices in the cluster 16 may comprise, for example, an array of one or more LED interior lights 18, an occupancy sensor 19, and an activation switch 21 for the LED lights 18. Each cluster 16 is coupled to a communication device such as a transceiver 14. A transceiver is able to receive data and control signals and to transmit data and control signals indicative of the state of a sensor or a piece of equipment that is connected to the transceiver. The signals may be information in the form of data, voice, music, video, or a command. The transceiver may be powered by a self-contained battery that is contained within the transceiver itself, or may receive power from an external source and from the conductive layers. Suitable transceivers are the SIG60 and SIG61 semiconductor devices manufactured by Yamar Electronics Ltd, although transceivers are available from other sources, and will also perform the required tasks. Each transceiver 14 has two transceiver leads 35 and 36 that electrically couple the transceiver to the fiber composite material forming the roof 13 as described more fully below. As shown in FIG. 2, the roof 13 may also support backlight control transceivers 23 that are used to turn backlights 24 that are mounted at the rear of the vehicle on and off. All or a portion of the exterior surface of the roof may be provided with one or more solar panels 26 for providing power to the roof clusters 16 and any electrical equipment that is coupled thereto.

FIG. 2 is a sectional view of a portion of the interior of the roof 13 of FIG. 1. The roof 13 is formed by a fiber composite laminate comprising at least a first fiber composite layer 31 and a second fiber composite layer 32 that are separated from one another by a layer of electrically insulating material 34 such as fiberglass. The fiber composite layers 31 and 32 may comprise carbon fibers, or other conductive fibers that are imbedded in a resin matrix. Each transceiver 14 has at least two leads; the first transceiver lead 35 is electrically coupled to the first fiber composite layer 31, and the second transceiver lead 36 is coupled to the second fiber composite layer 32. The electrical connection 37 between the leads 35, 36 and the fiber composite layers 31, 32 may be made by a screw, a rivet, an electrically conductive mechanical clamp, by soldering or welding, by the use of conductive adhesive, or any other electrical connection device. A central control module 40 is coupled to the two fiber composite layers 31 and 32 by two module leads 41 and 42. The first module lead 41 is connected to the first fiber composite layer 31, and the second module lead 42 is connected to the second fiber composite layer 32. The central control module 40 has switches 43 for controlling the utilities such as the LED lights in the device clusters 16 that are mounted on the roof 13, or for controlling the back-lights 24. The plurality of switches 43 on the central control module may be used for sending commands to a preselected one of the transceivers 14 and 23, each of the switches sending a command to a different one of the transceivers. The central control module 40 can operate also as a gateway between the vehicle's computer and the transceivers 14. The term "gateway" is used to designate a device that translates the information generated by the vehicle's computer into data format used by the transceiver devices and vise versa. Alternatively, the computer may send the information in a format used by the transceiver, in which case the central control module 40 does not have to operate as a gateway.

In use, the fiber composite layers 31 and 32 are conductive and connect power and signals between the two module leads 41 and 42 from the central control module 40 and the control transceivers 14 and 23 without the need for separate wires. The signals may be information in the form of data, voice, music, video, or a command. Each transceiver 14 and 23 has a unique address that is built into it, or is allocated dynamically upon power-up. The central control module 40 is able to send a signal to a preselected transceiver 14 by addressing the signal to the transceiver having the matching address. The central control module 40 is capable of sending messages that are addressed to one or more of the transceivers 14 and 23 through the fiber composite layers 31 and 32. Each transceiver 14 couples the received signals to the devices in the individual clusters 16. Information from the devices in the individual clusters may be sent in the form of modulated signals sent by the transceivers 14 and 23 to the central control module 40. The modulated signals are identified by the unique address of each transceiver 14 and 23 so that the central control module 40 knows the source of the signal. The central control module 40 transmits and receives signals at preselected carrier frequencies up to 30 MHZ. Signals that are greater in frequency than 30 MHZ will increasingly radiate throughout the fiber composite layers 31 and 32 rather than be conducted by the fiber composite layers. Details of the transceivers 14 and 23, and the method of communicating between the central control module 40 and the transceivers are provided in the data sheets for the SIG60 and SIG61 semiconductor devices manufactured by Yamar Electronics Ltd and the US patents to Maryanka cited above. Other transceivers to receive and send signals may also be used.

Figure 3:
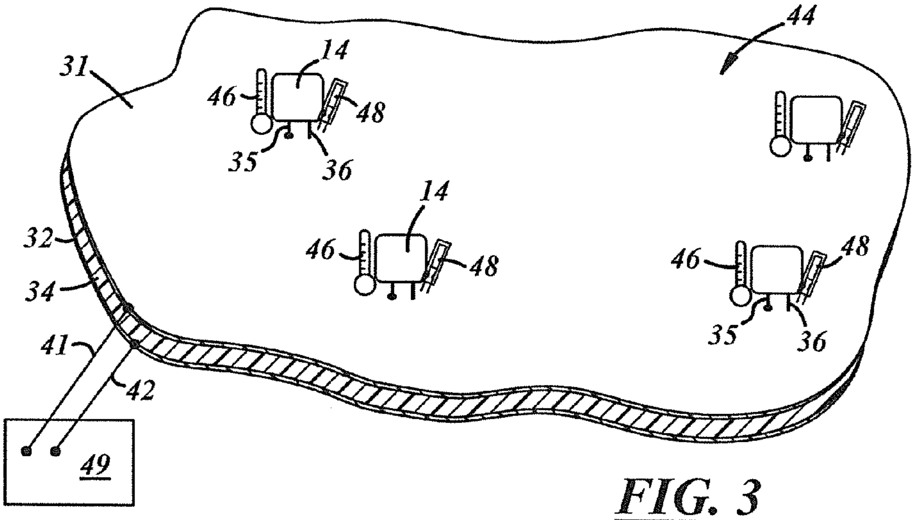
FIG. 3 is a diagrammatic view of a part of an avionic body structure with sensors and powerline devices.

FIG. 3 is a diagrammatic view of a part of the body structure 44 of an avionic vehicle with sensors and powerline devices. The body structure 44 comprises first and second fiber composite layers 31 and 32, respectively that are electrically separated by an insulating layer 34. Temperature sensors 46 and stress gages 48 are distributed across the surface of the structure 44. Each temperature sensor 46 and strain gage 48 is electrically connected to a transceiver 14. Each transceiver 14 is electrically connected to the first and second fiber composite layers 31 and 32 by first and second transceiver leads 35 and 36, respectively. Each transceiver 14 may be powered by a self-contained power source such as a rechargeable battery, or may receive power from the fiber composite layers 31 and 32. A central control module 49 is electrically connected to the two fiber composite layers 31 and 32 by module leads 41 and 42. The central control module 49 may be used to apply AC or DC power to the fiber composite layers to power the temperature and stress sensors 46 and 48 and the associated control transceivers 14, and to charge the rechargeable batteries when such batteries are installed. Signals from the individual sensors 46 and 48 are connected through the transceiver leads 35 and 36 to the first and second fiber composite layers 31 and 32, and to the central control module 49 without the need for individual wires connecting each of the sensors 46 and 48 to the central control module 49.

The system of FIG. 3 may be used for diagnostic purposes to monitor the integrity of an airframe. An AC or DC voltage may be applied by the central control module 49 to the two electrically isolated fiber composite layers 31 and 32. The isolated fiber composite layers 31 and 32 will act as conductors to provide power to the transceivers 14, and to the temperature and stress sensors 46 and 48, eliminating the need for additional wires for power or signal communication between the temperature and stress sensors and the central control module 49. The AC or DC power can be applied for a short period of time before reading the sensors, to save power consumption. The central control module 49 and the transceivers 14 will create a communication network throughout the composite airframe structure, using the fiber composite layers 31 and 32 as a conduit for the signals from the temperature and stress sensors 46 and 48. Redundancy is accomplished by using multiple control transceivers 14 throughout the composite airframe structure. The network can be used as an aircraft communication system, or as a diagnostic system to detect anomalies and changes in the composite structure by capturing data from each temperature and stress sensor 46 and 48 that is connected to the fiber composite layers 31 and 32. Signals are transmitted by the transceivers 14 through the fiber composite layers 31 and 32 to the module leads 41 and 42, and to the central control module 49 without the need for additional wiring.

The system of FIG. 3 may also be used for other functions relating to sensing, monitoring, and actuation control required on aircraft. For example, a transceiver 14 may be coupled to a motor, and the motor may be used to change the position of a control surface on the aircraft such as a flap. In this way, the cabling complexity of modern manned and unmanned aircraft can be significantly reduced. By reducing the cabling required for multiple sensors, weight is significantly reduced and maintenance is simplified.

Figure 4:
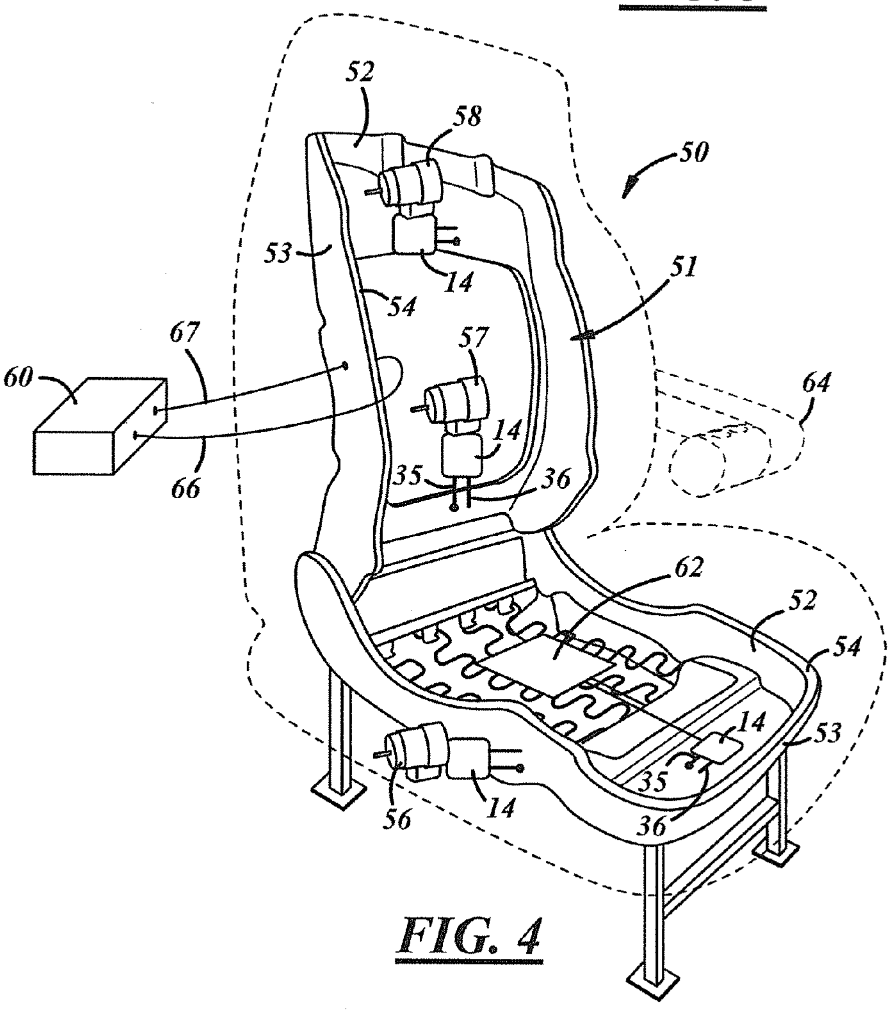
FIG. 4 shows a seat having integrated motors and controls connected thereto.

FIG. 4 shows a seat 50 having integrated motors and controls connected thereto. The shell 51 of the seat comprises first and second fiber composite layers 52 and 53 that are electrically insulated from one another by an intermediate layer 54 of an insulating material such as fiberglass. A plurality of motors 56-58 are mounted on the shell 51 of the seat for adjusting seat to the requirements of the occupant. For example, the motor 56 may adjust the tilt angle of the base portion of the seat, the motor 57 may adjust the incline angle of the seat back, and the motor 58 may adjust the position of a neck and shoulder support bolster. Each motor 56-58 is connected to a transceiver 14 that has a unique address. Each transceiver 14 is electrically connected to the first and second fiber composite layers 52 and 53 by transceiver leads 35 and 36, respectively. An occupancy sensor 62 may be mounted on the lower seat cushion to detect when the seat is occupied. The occupancy sensor 62 is electrically connected to a control transceiver 14 that is connected to the inner and outer fiber composite layers 52 and 53. A seat control module 60 is electrically connected by first and second seat leads 66 and 67, respectively, to the first and second carbon fiber layers 52 and 53, and applies a low power AC or DC voltage to the layers to power the motors 56-58 that are coupled to the seat. The seat control module 60 also sends addressed motor control signals to the transceivers 14 to activate the individual motors 56-58 and adjust the seat position and contour as required. The seat control module 60 may be mounted on the arm 64 of the seat or at some other location that is convenient for the occupant of the seat. An entertainment control may be included in the seat control module 60. The entertainment and seat control 60 may include control of overhead lights for illumination of the seat area, service call signals, and audio and visual entertainment controls.

Having thus described the invention, various modifications and alterations will occur to those skilled in the art, which modifications and alterations will be within the scope of the invention as defined by the appended claims.

We claim:

1. A method of wireless communication using a fiber composite structure, the method comprising:
providing a first conductive fiber composite layer;
providing a second conductive fiber composite layer;
electrically isolating the first conductive fiber composite layer from the second conductive fiber composite layer using an insulating layer between the first and second fiber composite layers; and,
connecting a communication device to the first and second conductive fiber composite layers, whereby the two conductive fiber composite layers conduct at least one of a data signal, voice signal, music signal, video signal or a command signal to or from the communication device without the requirement of separate wires.

2. The method of claim 1 further comprising:
providing a carbon fiber comprising the fiber in the first and second conductive fiber composite layers.

3. The method of claim 1 further comprising:
connecting a plurality of communication devices to the first and second composite layers, each communication device comprising a transceiver that is able to send or receive signals.

4. The method of claim 3 further comprising:
controlling the signals sent by the transceiver so that the frequency of the signals is less than 30 MHZ.

5. The method of claim 3 further comprising:
assigning a unique address to each transceiver, whereby the unique address uniquely identifies each transceiver from the other transceivers.

6. The method of claim 3 further comprising:
coupling a first transceiver lead to the first composite layer and coupling a second transceiver lead to the second composite layer; and,
coupling the transceiver to the composite structure using the first and second transceiver leads.

7. The method of claim 6 further comprising:
connecting the first and second transceiver leads to the composite layers using a screw or a rivet or an electrically conductive clamp or a solder connection.

8. The method of claim 3 further comprising:
connecting a central control module to the first and second composite layers; and,
sending addressed signals from the central control module to the transceivers, whereby the central control module is able to send a signal to a preselected transceiver by addressing the signal to the transceiver having the matching address.

9. The method of claim 8 further comprising:
sending commands to a preselected one of the transceivers from a plurality of switches on the central control module, each of the switches sending a command to a different one of the transceivers.

10. The method of claim 8 further comprising:
mounting a plurality of light emitting devices on the fiber composite structure;
coupling each light emitting device to a transceiver having a unique address; and,
addressing a signal from the central control module to a selected one of the light emitting devices by using the unique address of the transceiver.

11. The method of claim 8 further comprising:
connecting an electrical device requiring electrical power to the first and second composite layers; and,
applying a voltage to the first and second composite layers, whereby the two composite layers conduct electrical power to the electrical device without the requirement of separate wires.

12. The method of claim 11 further comprising:
applying the voltage to the two composite layers using the central control module.

13. The method of claim 11 further comprising:
mounting at least one of a temperature sensor gage or a strain sensor gage to the fiber composite structure; and,
powering the at least one sensor gage from the central control module through the fiber composite layers without the requirement of separate wires.

14. The method of claim 13 further comprising:
sending a signal from the at least one sensor gage to the central control module through the fiber composite layers without the requirement of separate wires.

15. The method of claim 14 further comprising:
mounting a plurality of a temperature sensor gages and strain sensor gages to the fiber composite structure; and,
coupling each temperature sensor gage and strain sensor gage to a transceiver having a unique address, whereby the central control module recognizes the unique address of the control transceiver coupled to the temperature sensor gages and strain sensor gages.

16. The method of claim 1 further comprising:
forming the roof of a vehicle using the first and second conductive fiber composite layers.

17. The method of claim 1 further comprising:
forming the body structure of an avionic vehicle using the first and second conductive fiber composite layers.

18. The method of claim 1 further comprising:
forming the shell of a seat using the first and second conductive fiber composite layers.

19. The method of claim 18 further comprising:
mounting a plurality of motors on the seat;
coupling a plurality of transceivers one each to the plurality of motors;
coupling a seat controller to the seat;
coupling an AC or DC voltage to the first and second conductive fiber composite layers using the seat controller; and,
conducting electrical power to the plurality of motors using the two conductive fiber composite layers without the requirement of separate wires.

20. The method of claim 19 further comprising:
coupling a transceiver having a unique address to each of the motors; and,
individually controlling the motors by sending a control signal from the seat controller to the unique address of the individual transceivers.

21. The method of claim 19 further comprising:

providing light control capability in the seat controller, whereby the seat controller may control illumination of the seat area.

* * * * *